United States Patent
Cheng

(10) Patent No.: US 11,405,932 B2
(45) Date of Patent: Aug. 2, 2022

(54) METHOD AND APPARATUS FOR POWER CONTROL OF WIRELESS COMMUNICATIONS

(71) Applicant: Hannibal IP LLC, Frisco, TX (US)

(72) Inventor: Yu-Hsin Cheng, Hsinchu (TW)

(73) Assignee: Hannibal IP LLC, Frisco, TX (US)

( * ) Notice: Subject to any disclaimer, the term of this patent is extended or adjusted under 35 U.S.C. 154(b) by 21 days.

(21) Appl. No.: 16/533,635

(22) Filed: Aug. 6, 2019

(65) Prior Publication Data
US 2020/0053743 A1 Feb. 13, 2020

Related U.S. Application Data

(60) Provisional application No. 62/716,098, filed on Aug. 8, 2018.

(51) Int. Cl.
| | | |
|---|---|---|
| *H04W 72/10* | (2009.01) | |
| *H04W 72/04* | (2009.01) | |
| *H04W 4/40* | (2018.01) | |
| *H04L 5/00* | (2006.01) | |
| *H04W 52/24* | (2009.01) | |

(52) U.S. Cl.
CPC .......... *H04W 72/10* (2013.01); *H04L 5/0051* (2013.01); *H04W 4/40* (2018.02); *H04W 52/242* (2013.01); *H04W 72/042* (2013.01); *H04W 72/0453* (2013.01); *H04W 72/0473* (2013.01)

(58) Field of Classification Search
CPC ............... H04W 72/10; H04W 72/042; H04W 72/0453; H04W 72/0473; H04W 4/40; H04W 52/242; H04L 5/0051

USPC .......................................................... 370/329
See application file for complete search history.

(56) References Cited

U.S. PATENT DOCUMENTS

| | | | |
|---|---|---|---|
| 9,295,096 B1 * | 3/2016 | Shukla ................. | H04W 76/14 |
| 2018/0049220 A1 * | 2/2018 | Patil ................. | H04W 72/0426 |
| 2019/0116475 A1 * | 4/2019 | Lee ........................ | H04W 72/02 |
| 2019/0305908 A1 * | 10/2019 | Lee ........................ | H04L 1/0009 |

FOREIGN PATENT DOCUMENTS

| | | |
|---|---|---|
| CN | 106850860 A | 6/2017 |
| CN | 112514485 | 3/2021 |
| EP | 3834550 | 6/2021 |

(Continued)

OTHER PUBLICATIONS

Extended European Search Report for European Patent Application No. EP3834550, dated Mar. 17, 2022.

(Continued)

*Primary Examiner* — Chi Tang P Cheng
(74) *Attorney, Agent, or Firm* — Marcella M. Bodner; Cole Schotz, P.C.

(57) ABSTRACT

A method performed by a user equipment (UE) is disclosed. The method includes receiving, using a first RAT, first SCI including a first priority value, and receiving, using a second RAT, second SCI including a second priority value. The method also includes determining whether to drop one of a transmission of a first physical channel derived from the first SCI and a transmission of a second physical channel derived from the second SCI based on the first priority value and the second priority value when the first physical channel overlaps the second physical channel in the time domain.

14 Claims, 5 Drawing Sheets

(56) References Cited

FOREIGN PATENT DOCUMENTS

| | | |
|---|---|---|
| WO | 2017078599 | 5/2017 |
| WO | 2018027528 A1 | 2/2018 |
| WO | 2018125686 | 7/2018 |
| WO | 2020029985 | 2/2020 |

OTHER PUBLICATIONS

International Preliminary Report on Patentability dated Feb. 9, 2021 for International Patent Application No. PCT/CN2019/099538.
International Search Report and Written Opinion dated Oct. 30, 2019 for International Patent Application No. PCT/CN2019/099538.

* cited by examiner

METHOD AND APPARATUS FOR POWER CONTROL OF WIRELESS COMMUNICATIONS

CROSS-REFERENCE TO RELATED APPLICATION(S)

The present application claims the benefit of and priority to a provisional U.S. Patent Application Ser. No. 62/716,098, filed on Aug. 8, 2018, entitled "Method and Apparatus for power control in Vehicle-to-everything (V2X) communication," (hereinafter referred to as "US74692 application"). The disclosure of the US74692 application is hereby incorporated fully by reference into the present application.

FIELD

The present disclosure generally relates to wireless communications, and more particularly, to methods and apparatuses for power control in wireless communications (e.g., Vehicle-to-everything (V2X) communications).

BACKGROUND

Various efforts have been made to improve different aspects of wireless communications (e.g., data rate, latency, reliability, mobility, etc.) for the next generation (e.g., 5G New Radio (NR)) wireless communication systems. Among these efforts, one area of interest for further development in the next generation wireless communication systems is Device-to-Device (D2D) communications (e.g., Vehicle-to-everything (V2X) communications). In D2D communications, the devices may communicate directly with each other via Sidelink (SL) connections.

The flexibility of NR SL framework may allow easy extension of the next generation wireless communication systems to support future developments of advanced V2X services among other services. However, the power control of V2X transmissions still present different challenges.

Therefore, there is a need in the art for providing methods and apparatuses for power control in wireless communications.

SUMMARY

The present disclosure is directed to methods and apparatuses for power control in wireless communications.

According to an aspect of the present disclosure, a user equipment (UE) is provided. The UE includes one or more non-transitory computer-readable media having computer-executable instructions embodied thereon and at least one processor coupled to the one or more non-transitory computer-readable media. The at least one processor is configured to execute the computer-executable instructions to receive, using a first Radio Access Technology (RAT), first Sidelink Control Information (SCI) including a first priority value; receive, using a second RAT, second SCI including a second priority value; and determine whether to drop one of a transmission of a first physical channel derived from the first SCI and a transmission of a second physical channel derived from the second SCI based on the first priority value and the second priority value when the first physical channel overlaps the second physical channel in the time domain.

According to another aspect of the present disclosure, a method performed by a UE is provided. The method includes the following actions. First SCI including a first priority value is received using a first RAT. Second SCI including a second priority value is received using a second RAT. Whether to drop one of a transmission of a first physical channel derived from the first SCI and a transmission of a second physical channel derived from the second SCI is determined based on the first priority value and the second priority value when the first physical channel overlaps the second physical channel in the time domain.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
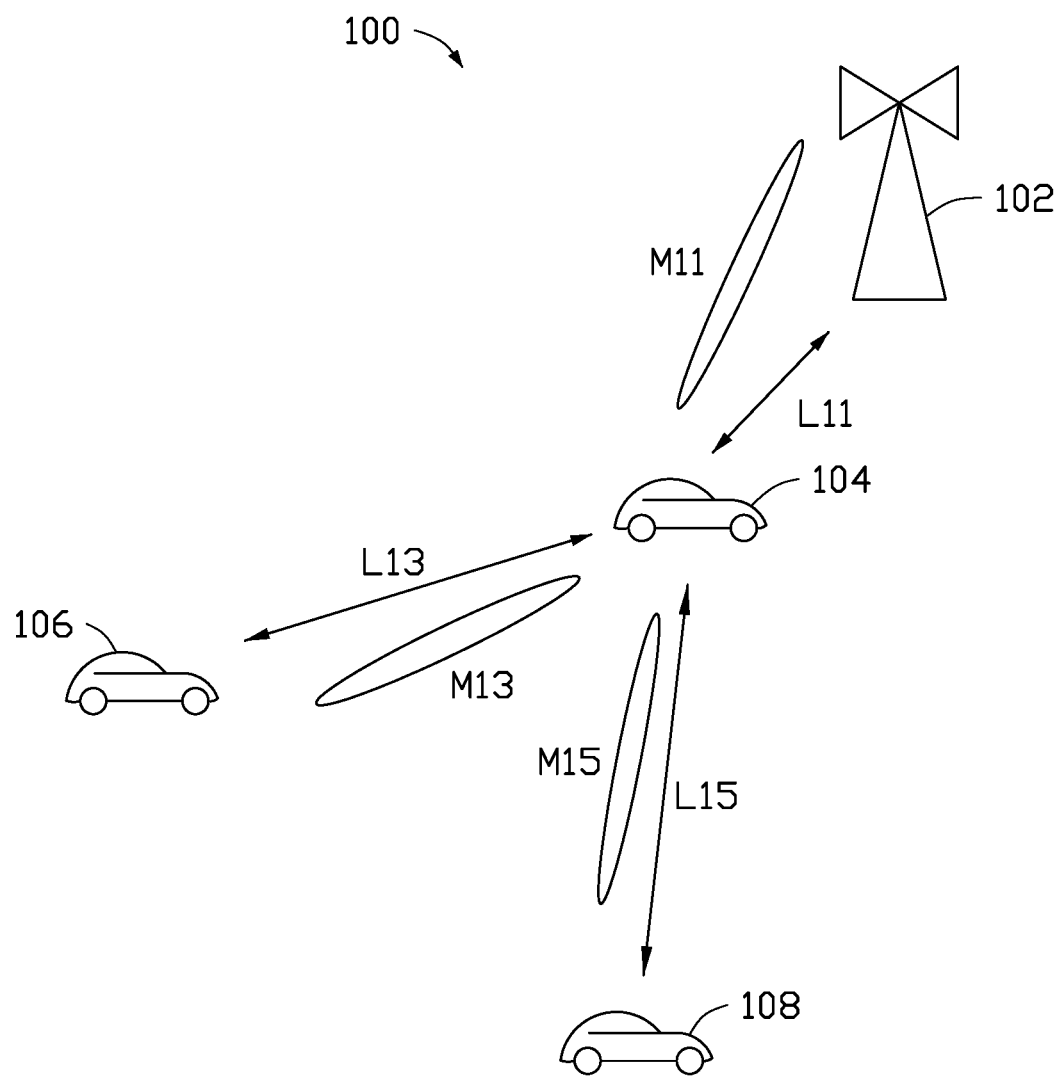
FIG. 1 is a schematic diagram illustrating a V2X system, in accordance with example implementations of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features are identified (although, in some of the present implementations, not shown) by numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station (BS), at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM EDGE Radio Access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved node B (eNB) as in the LTE or LTE-A, a radio network controller (RNC) as in the UMTS, a Base Station Controller (BSC) as in the GSM/GERAN, a ng-eNB as in an E-UTRA BS in connection with the 5GC, a next generation Node B (gNB) as in the 5G-RAN, and any other apparatus capable of controlling radio communication and managing radio resources within a cell. The BS may connect to serve the one or more UEs through a radio interface to the network.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally Uplink (UL) resources to at least one UE within its radio coverage for downlink and optionally UL packet transmissions). The BS can communicate with one or more UEs in the radio communication system through the plurality of cells. A cell may allocate SL resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and a UL transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects and represents that three relationships may exist. For example, A and/or B may indicate that: A exists alone, A and B exist at the same time, and B exists alone. In addition, the character "/" herein generally represents that the former and latter associated objects are in an "or" relationship.

FIG. 1 is a schematic diagram illustrating a V2X system, in accordance with example implementations of the present disclosure. As shown in FIG. 1, the V2X system 100 (e.g., an NR-V2X system) may include a BS 102 and several UEs (e.g., UEs 104, 106 and 108). It should be noted that even though only three UEs 104, 106, and 108 are included in the example implementation illustrated in FIG. 1, any number of UEs may communicate with each other in some other implementations of the present application.

The UE 104 may communicate with the BS 102 via a UL and/or a Downlink (DL) connection of a V2X-Uu interface L11. For example, the UE 104 may monitor a beam (or a Reference Signal (RS)) M11 on the V2X-Uu interface L11 based on the beam information configured in a Control Resource Set (CORESET) configuration. The UE 104 may further communicate with other UEs 106 and 108 via SL PC5 interfaces L13 and L15, respectively. In addition, the UE 104 may apply beamforming technology to generate beams M13 and M15 to perform directional transmissions and receptions with the UEs 106 and 108.

In the V2X system 100, the power control of the physical channels and the Reference Signals (RSs) may need to meet the Frequency Range 1 (FR1) and Frequency Range 2 (FR2) common design. Moreover, because some V2X services may require a higher reliability performance, the reliability of the NR-V2X physical channels may need to be improved.

In some of the present implementations, an in-coverage UE (e.g., a mode-3 UE) may determine a transmit power for an NR-V2X physical channel (e.g., a Physical Sidelink Control Channel (PSCCH) or a Physical Sidelink Shared Channel (PSSCH)) according to the following equations (e.g., Equations 1-1 and 1-2):

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) + \quad \text{Equation 1-1}$$
$$\min\{P_{CMAX}, 10\log_{10}(M_{PSSCH} + 10^{\frac{3}{10}} \times M_{PSCCH}) +$$
$$P_{O\_PSSCH,3} + \alpha \cdot PL\}$$

$$P_{PSSCH} = 10\log_{10}\left(\frac{M_{PSSCH}}{M_{PSSCH} + 10^{\frac{3}{10}} \times M_{PSCCH}}\right) + \quad \text{Equation 1-2}$$
$$\min\{P_{CMAX}, 10\log_{10}(M_{PSSCH} + 10^{\frac{3}{10}} \times M_{PSCCH}) +$$
$$P_{O\_PSSCH,3} + \alpha \cdot PL\}$$

In the above equations, $P_{PSCCH}$ is the transmit power for a PSCCH, $P_{PSSCH}$ is the transmit power for a PSSCH, $P_{CMax}$ is the UE's maximum transmit power on a carrier frequency or a resource pool, $M_{PSSCH}$ is the bandwidth of a PSSCH resource assignment (expressed in the number of resource blocks), $M_{PSCCH}$ is the bandwidth of a PSCCH resource assignment (expressed in the number of resource blocks), $P_{MAX\_CBR}$ may be a transmission power determined based on the priority level of the PSSCH and the Channel Busy Ratio (CBR) range (including a CBR measured in subframe n-4), $P_{O\_PSSCH}$ is the power offset value for the PSSCH (where $P_{O\_PSSCH,3}$ is for NR resource allocation mode 1 (e.g., scheduled by a BS), and $P_{O\_PSSCH,4}$ is for NR resource allocation mode 2 (e.g., a UE may autonomously select the resources for transmission)), PL is a pathloss value, and α is a coefficient of the pathloss value. In some of the present implementations, the α values involved in Equations 1-1 and 1-2, as demonstrated above, and Equations 2-1, 2-2, 3, 4, and 5, as demonstrated below, may be independently (pre-) configured for NR resource allocation mode 1 and NR resource allocation mode 2.

On the other hand, for an out-of-coverage UE (e.g., a mode-4 UE), the transmit power for an NR-V2X physical channel may be determined according to the following equations (e.g., Equations 2-1 and 2-2):

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) + B \quad \text{Equation 2-1}$$

$$P_{PSSCH} = 10\log_{10}\left(\frac{M_{PSSCH}}{M_{PSSCH} + 10^{\frac{3}{10}} \times M_{PSCCH}}\right) + A \quad \text{Equation 2-2}$$

where $$B = \min\{P_{CMAX}, P_{MAX\_CBR},$$
$$10\log_{10}(M_{PSSCH} + 10^{\frac{3}{10}} \times M_{PSCCH}) +$$
$$P_{O\_PSSCH,4} + \alpha \cdot PL\}$$
$$A = \min\{P_{CMAX}, P_{MAX\_CBR},$$
$$10\log_{10}(M_{PSSCH} + 10^{\frac{3}{10}} \times M_{PSCCH}) +$$
$$P_{O\_PSSCH,4} + \alpha \cdot PL\}.$$

In some of the present implementations, for both of the in-coverage UEs and the out-of-coverage UEs, the pathloss values (e.g., PL) may be calculated based on the Sidelink Reference Signal Received Power (S-RSRP). The S-RSRP may be defined by a linear average over power contributions (in Watts) of the resource elements (that carry Demodulation Reference Signals (DMRSs) associated with the Physical Sidelink Broadcast Channel (PSBCH)) within the central six Physical Resource Blocks (PRBs) of the applicable subframes. However, in NR-V2X, the broadcast system information (e.g., Master Information Block-Sidelink (MIB-SL)) may be transmitted in more than one PSBCH within one MIB-SL transmission periodicity due to the beam operation. In some of the present implementations, a MIB-SL may be referred to as a MIB for LTE V2X or a MIB for NR V2X.

Hence, in some of the present implementations, the NR-V2X pathloss calculation may consider the change of RS(s). Moreover, considering that NR-V2X transmissions may coexist with different RAT transmissions (e.g., LTE UL transmissions, NR UL transmissions, or LTE-V2X transmissions), power sharing operations for RAT coexistence may be used.

Synchronization Signal (SS) and MIB-SL of V2X System

In some of the present implementations, a MIB-SL may be transmitted in a predefined period (e.g., 40 millisecond (ms) or 160 ms) with a starting offset that is determined by an offset value (e.g., syncOffsetIndicator). Such an offset value may be configured by Radio Resource Control (RRC) signaling, or may be contained in a pre-configuration parameter (e.g., defined by the Third Generation Partnership Project (3GPP) technical specifications), or contained in broadcast system information. In addition, the offset value may be used to indicate a subframe offset between a starting/first Direct Frame Number (DFN) (in a MIB-SL transmission period) and a particular DFN (where an SS and a MIB-SL are transmitted in the MIB-SL transmission period). In some of the present implementations, more than one SS may be transmitted in one MIB-SL transmission period for different beam directions due to beam operations.

In some of the present implementations, more than one offset value may be used to indicate the time/frequency resource location of a MIB-SL. For example, if a UE receives two offset values, where one is "20" and the other one is "35," the UE may assume that the SS will be transmitted in a subframe with a Direct Subframe Number (DSFN) of "20" (e.g., which is corresponding to the 20$^{th}$ subframe after the first DFN of the MIB-SL transmission period), while the MIB-SL will be transmitted in a subframe with a DSFN of "35" (e.g., which is corresponding to the 35$^{th}$ subframe after the first DFN of the MIB-SL transmission period).

In some of the present implementations, a bitmap may be used to indicate in which subframe(s) the SS and/or the MIB-SL are transmitted. That is, each bit of the bitmap may represent a subframe-level resource location. For example, if the length of a MIB-SL transmission period is 40 ms, the bitmap may include 40 bits with each bit corresponding to one subframe of the MIB-SL transmission period. With the bitmap, a UE may know in which subframes of the MIB-SL transmission period the SS and the MIB-SL are transmitted.

In some of the present implementations, a bitmap may be used to indicate in which symbols the SS and/or the MIB-SL are transmitted. That is, each bit of the bitmap may represent a symbol-level resource location. For example, if the length of a MIB-SL transmission period is 40 ms and each subframe (or time slot) includes 14 OFDM symbols, the bitmap may include 14 bits with each bit corresponding to one OFDM symbol of a subframe (which may be indicated by an offset value, or by other indication approaches for a 15 KHz-subcarrier-spacing case). With the bitmap, a UE may know in which OFDM symbols the SS and the MIB-SL are transmitted. In some implementations of the present disclosure, each MIB-SL may include an indicator (e.g., an index) for distinguishing the different MIB-SLs within a DSFN. For example, the DMRSs for demodulating each MIB-SL may be generated by different sequences. These sequences may be determined by a predefined rule(s). For example, different DFN indices may lead to different sequences, so that a UE may know which sequence should be used to demodulate a MIB. Thus, the UE may distinguish the different MIB-SLs within one DSFN using these sequences. If the sequence used for generating MIB-SL #1 is different from another sequence used for generating MIB-SL #2 within one MIB-SL transmission period, the UE may distinguish MIB-SL #1 from MIB-SL #2 according to these two sequences.

In some of the present implementations, the time/frequency resource locations of an SS and a MIB-SL may be associated with each other. Thus, a UE may know the time/frequency resource location of the SS when the UE detects the RSs for the MIB-SL. In some of the present implementations, the UE may distinguish different SSs (or different MIB-SLs) transmitted in a MIB-SL transmission period based on an indicator contained in each SS (or MIB-SL). For example, if the length of a MIB-SL transmission period is 40 milliseconds (ms), and the UE receives two offset values (e.g., two syncOffsetIndicator, where one is "20" and the other one is "35"), the UE may distinguish the MIB-SL from the associated SS based on different DSFNs contained in each MIB-SL. In some of the present implementations, a UE may obtain the information for distinguishing a MIB-SL from an SS in one DSFN based on the information contained in the MIB-SL and the information obtained from the sequences of the DMRSs of the MIB-SL.

Associated RSs for Pathloss Calculation of NR-V2X

As described above, a pathloss value (e.g., PL) may be calculated based on S-RSRP in some of the present implementations. The S-RSRP may be defined as a linear average over the power contributions (in [Watt]) of the resource elements that carry the DMRSs associated with the PSBCH. In addition, a UE may detect different MIB-SLs in different time locations in one MIB-SL transmission periodicity.

In some of the present implementations, a UE may determine a pathloss value for an SL based on an RS index. The RS index may be associated with an RS of a most recent MIB-SL that is successfully decoded by the UE. For example, assuming that the length of a MIB-SL transmission period is 40 ms, and the UE has received two offset values of "20" and "35," if the UE successfully detects and decodes a MIB-SL in DSFN #20 (assuming that the first DSFN is "DSFN #0" in the first MIB-SL transmission period), the UE may select an RS for pathloss calculation based on the S-RSRP of the DMRSs of the MIB-SL in DSFN #20. The selected RS may be associated with an RS index, and the UE may determine the pathloss value based on the RS index during the pathloss calculation. In the next MIB-SL transmission period, if the UE fails to detect a MIB-SL in DSFN #60, but successfully detects (and decodes) a MIB-SL in DSFN #75, then the UE may still use the same RS (which is selected based on the most recent successfully decoded MIB-SL in DSFN #20) before DSFN #75 for pathloss calculation. After DSFN #75, the UE may select an RS for pathloss calculation based on the S-RSRP of the DMRSs of the MIB-SL in DSFN #75.

It should be noted that the pathloss calculation mechanism described herein may also be applied to the transmit power calculation of any NR-V2X physical channel (e.g., a PSSCH or a PSCCH) or NR-V2X RS (e.g., a DMRS of PSBCH/PSCCH/PSSCH, a Phase Tracking RS (PTRS), a fine time and frequency Tracking RS (TRS), or an SS).

In some of the present implementations, a BS may use the Downlink Control Information (DCI) for NR-V2X (e.g., DCI_NR_V) to indicate to a UE the RSs for pathloss calculation for a scheduling PSCCH and/or PSSCH. Such a UE may be an in-coverage UE (e.g., a mode-3 UE), or a UE which selects to transmit the NR-V2X physical channels and RSs in a resource pool (where the resource allocation of the resource pool may be scheduled by the BS based on a Buffer State Reporting (BSR) report transmitted from the UE).

In some of the present implementations, the DCI (e.g., DCI_NR_V) may include an indicator (e.g., RS_SL_power) for indicating which RS(s) is used as the reference for pathloss calculation. The indicated RS may be an SS or a Channel State Information RS (CSI-RS), which may be transmitted over an NR or LTE UL channel. The indicator in the DCI may be an index of the indicated RS (e.g., a Synchronization Signal Block (SSB) index or a CSI-RS resource index), or an index contained in a mapping table (e.g., RS_SL_power_list). An example mapping table is as follows:

TABLE 1

| Index | Reference Signals (RSs) |
|---|---|
| 0 | SSB #0 |
| 1 | SSB #1 |
| 2 | SSB #2 |
| 3 | SSB #3 |
| 4 | CSI-RS #0 |
| . | . |
| . | . |
| . | . |
| 7 | CSI-RS #3 |

According to Table 1, if a UE receives a DCI_NR_V that contains an index of "1," the UE may calculate a UL transmit power based on the measurement result of the pathloss of SSB #1 (which is associated with the index of "1" in Table 1).

In some of the present implementations, the pathloss calculation (which is based on the RS(s) indicated by the DCI_NR_V) may be performed only when the UE has not yet received any SS from an NR-V2X physical channel or other SL physical channels.

In some of the present implementations, a UE may determine a pathloss value for an SL based on an SSB associated with a PDSCH, where the UE receives a SIB. For example, the UE may use the RS(s) to calculate the pathloss value of a scheduling PSCCH and/or a PSSCH based on an SSB (where the UE receives a SIB for an NR-V2X configuration on a PDSCH associated with the SSB). The UE may be an in-coverage UE (e.g., a mode-3 UE), or a UE which selects to transmit an NR-V2X physical channel and RSs in a resource pool (where the resource allocation in this resource pool is scheduled by a BS based on a BSR report obtained from the UE). In some of the present implementations, each SSB may contain scheduling information for a PDCCH of a SIB, and the UE may receive the SIB based on the scheduling information. In some of the present implementations, the UE may determine a pathloss value for an SL based on the SSB (which is associated with a PDCCH containing the scheduling information of the SIB). For example, if a UE receives the scheduling information (for a PDCCH) on SSB #2 (or a MIB associated with SSB #2) and successfully receives a SIB for NR-V2X (e.g., SIB-NR-V) based on the scheduling information of that PDCCH, the UE may calculate the UL transmit power for an NR-V2X physical channel based on the measurement result of SSB #2.

Coexistence of NR-V2X with Other RAT(s)

In an LTE V2X system, a UE may determine whether to transmit a V2X channel (or an SL channel) and an LTE UL channel at the same time when the V2X channel and the LTE UL channel share the same serving cell. For example, if the V2X channel and the LTE UL channel locate in the same frequency band (or the cells of LTE UL and V2X have the same Absolute Radio-Frequency Channel Number (ARFCN) value), the V2X channel and the LTE UL channel may be considered as sharing the same serving cell. The determination may be achieved based on a priority indicator of the SCI and a threshold (e.g., thresSL-TxPrioritization), where such a threshold may be contained in an RRC configuration, a SIB, or a pre-configuration parameter defined by the 3GPP specifications. For example, if the priority indicator of the SCI is below the threshold, the UE may drop the UL grant of the LTE UL channel, but perform the transmissions on the V2X (or SL) physical channel. In contrast, if the priority indicator of the SCI is equal to or greater than the threshold, the UE may drop the V2X (or SL) physical channel transmission, but perform the LTE UL channel transmission.

Because an NR-V2X physical channel may coexist with other RAT(s) such as an NR UL physical channel, an LTE-V2X physical channel or an LTE UL physical channel, a UE may be configured with one or more thresholds for different RATs in some of the present implementations. In addition, each threshold may be configured per a resource pool basis or per an anchor carrier basis. For example, the UE may be configured with two thresholds: one threshold is for NR (e.g., thresSL-TxPrioritization-NR) and the other threshold is for LTE (e.g., thresSL-TxPrioritization-LTE). The UE may compare the priority indicator of the SCI with these two thresholds (e.g., thresSL-TxPrioritization-NR and thresSL-TxPrioritization-LTE) to determine which RAT transmission is to be dropped. For example, if the value of thresSL-TxPrioritization-NR is "4" and the value of thresSL-TxPrioritization-LTE is "6," when the UE receives SCI that contains a priority indicator with a value of "5," the UE may drop the LTE UL physical channel transmission and perform the NR physical channel transmission (if the UE has received the scheduling information of the NR-V2X, LTE and NR physical channels that overlap in the time domain).

In some of the present implementations, the UE may be configured with two thresholds for a resource pool: one threshold is for NR-V2X transmission (e.g., thresSL-TxPrioritization-NR), and the other threshold is for NR-URLLC transmission (e.g., thresSL-TxPrioritization-NR-urllc). If the thresSL-TxPrioritization-NR, the thresSL-TxPrioritization-NR-urllc and the priority indicator of SCI are "4," "1," and "3," respectively, the UE may drop the NR-V2X transmission and perform the NR-URLLC transmission because the value of the priority indicator is larger than the thresSL-TxPrioritization-NR-urllc, but less than the thresSL-TxPrioritization-NR (if the UE has received scheduling information of the NR-V2X and NR-UL physical channels, and the NR-V2X PSSCH and the NR-URLLC UL physical channel that overlap in the time domain).

In some of such implementations, the UE may distinguish an NR-URLLC scheduling from an NR scheduling according to a Radio Network Temporary Identifier (RNTI) (for PDCCH scrambling) or a Modulation and Coding Scheme (MCS) table (applied for a scheduling PUSCH). That is, the UE may know an NR scheduling is for NR-URLLC or not based on the RNTI(s) or the MCS table(s).

In some of the present implementations, the priority order of different RATs (e.g., an NR-V2X transmission and an LTE-V2X transmission) may depend on the priority indicators included in different SCIs (e.g., the SCI-NR-V for NR-V2X and the SCI-format 1 for LTE-V2X) that correspond to these RATs. For example, a UE may receive SCI-NR-V and SCI-format 1, and the PSSCH scheduled by the SCI-NR-V may overlap the PSSCH scheduled by the SCI-format 1 in the time domain. If the priority indicators in the SCI-NR-V and the SCI-format 1 are "1" and "4," respectively, the UE may drop the PSSCH transmission scheduled by the SCI-format 1 (because the PSSCH transmission scheduled by the SCI-NR-V has a higher priority than the PSSCH transmission scheduled by the SCI-format 1). It should be noted that the examples described herein are for illustrative purposes only, and not intended to limit the scope of the present invention. In some of the present implementations, different physical channel transmissions of different RATs may be prioritized based on a descending or ascending order of the values of the priority indicators in different SCIs.

In some of the present implementations, a UE may always drop the LTE-V2X PSSCH transmission, but perform the NR-V2X PSSCH transmission if the LTE-V2X PSSCH and NR-V2X PSSCH transmissions are scheduled in an overlapping time period. In some other aspects of the present implementations, a UE may always drop the NR-V2X PSSCH transmission, but perform the LTE-V2X PSSCH transmission if the LTE-V2X PSSCH and the NR-V2X PSSCH are scheduled in an overlapping time period.

In some of the present implementations, if a UE receives a slot format indicator for an NR physical channel through RRC signaling (e.g., an RRC configuration) or a SIB or DCI, the slot format indicator may be used to indicate the slot and symbols to be used in the DL or UL transmissions. For example, the UE may only consider a particular set of slots and symbols (e.g., indicated to be used in UL transmissions) as valid resources for transmitting or receiving the LTE-V2X and NR-V2X physical channels.

In some of the present implementations, if a UE receives a PSCCH which indicates that there may be a PSSCH transmitted on subframe #1 (which contains one or more DL resources indicated by the slot format indicator contained in an RRC configuration or a group common PDCCH), the UE may not try to receive the PSSCH scheduled by the PSCCH.

It should be noted that the physical channels described herein may include all kinds of physical channels (e.g., control, data or broadcast physical channels), as well as the RS(s) transmitted on the physical channels.

Power Sharing for NR-V2X and Other RAT(s)

In an LTE V2X system, a UE may perform a power sharing operation to adjust its UL transmit power. For example, in some of the present implementations, a UE may perform the power sharing operation when the total transmit power exceeds the maximum transmit power of the UE's capability (e.g., $P_{CMAX}$) and an LTE-V2X physical channel transmission overlaps with an LTE UL channel transmission in the time domain. Such a power sharing operation may also be applied to those cases where multiple physical channels (e.g., an LTE-V2X physical channel and an NR-V2X physical channel) of different RATs overlap each other in the time domain, but these physical channels are configured in different serving cells (e.g., locate in the different frequency bands, or the ARFCN values are different for the cell of LTE UL and the anchor carrier of V2X).

In some of the present implementations, the power sharing operation may be performed based on a priority indicator (e.g., contained in the SCI) and a threshold (e.g., thresSL-TxPrioritization), where the threshold may be contained in an RRC configuration, a SIB or a pre-configuration parameter. For example, if the priority indicator contained in the SCI is below the threshold, the UE may adjust the transmit power for an LTE UL channel but keep the original transmit power for a V2X or SL physical channel. In contrast, if the priority indicator contained in the SCI is greater than the threshold, the UE may adjust the transmit power for the V2X or SL physical channel, but keep the original transmit power for the LTE UL channel.

Considering that an NR-V2X physical channel may overlap with an NR UL physical channel, an LTE-V2X, an LTE UL physical channel, or other RATs in the time domain, a UE may be configured with one or more thresholds for different RATs in some of the present implementations. In addition, each threshold may be configured per a resource pool basis or per an anchor carrier basis. In some of the present implementations, a UE may be configured with two thresholds: one threshold is for NR (e.g., thresSL-TxPrioritization-NR) and the other threshold is for LTE (e.g., thresSL-TxPrioritization-LTE). In some of the present implementations, these two thresholds may be configured independently from the thresholds described in the previous section of "Coexistence of NR-V2X with Other RAT(s)". The UE may compare the priority indicator of the SCI with the thresholds (e.g., thresSL-TxPrioritization-NR and thresSL-TxPrioritization-LTE) to determine which RAT's transmit power has to be adjusted. For example, if the values of thresSL-TxPrioritization-NR and thresSL-TxPrioritization-LTE are "4" and "6," respectively, when the UE receives SCI which contains a priority indicator with a value of "5," the UE may keep the original transmit power for the NR UL physical channel transmission, but adjust the transmit power for the LTE NR UL physical channel and the NR-V2X physical channel (if the UE has received the scheduling information of the NR-V2X, LTE and NR UL physical channels which overlap each other in the time domain, and the total transmit power exceeds the value of P_CMAX).

In some of the present implementations, the UE may be configured with a threshold for NR-V2X (e.g., thresSL-TxPrioritization-NR) and a threshold for NR-URLLC (e.g., thresSL-TxPrioritization-NR-urllc) for a resource pool. If the values of the thresSL-TxPrioritization-NR, the thresSL-TxPrioritization-NR-urllc and the priority indicator in the SCI are "4", "1", and "3", respectively, the UE may adjust (e.g., reduce) the transmit power of the NR-V2X transmission and keep the original transmit power of the NR-URLLC transmission (if the UE has received scheduling information of the NR-V2X and NR-URLLC physical channels which overlap each other in the time domain, and the total transmit power exceeds the P_CMAX).

In some of such implementations, the UE may distinguish an NR-URLLC scheduling from an NR scheduling according to an RNTI (for PDCCH scrambling) or an MCS table (applied for a scheduling PUSCH).

Figure 2:
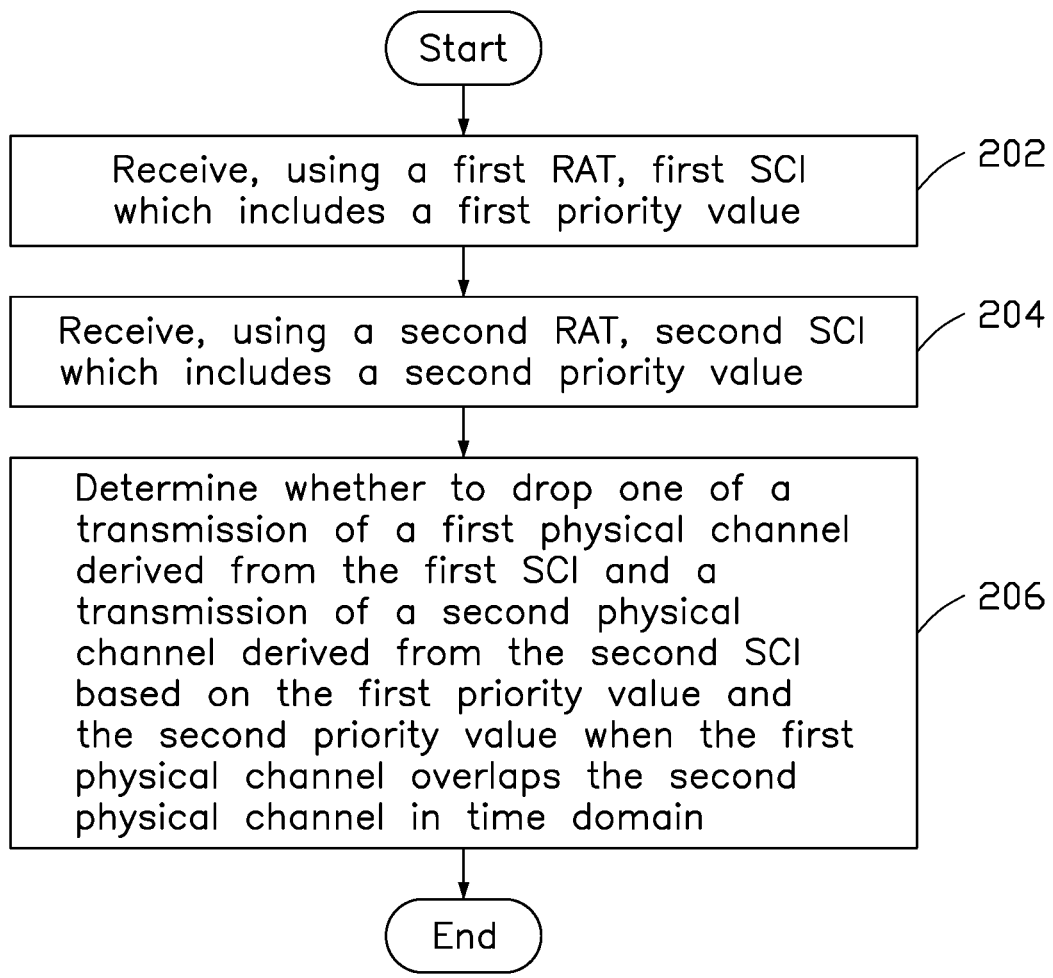
FIG. 2 is a flowchart for a method of power control of wireless communications, in accordance with example implementations of the present disclosure.

FIG. 2 is a flowchart for a method of power control of wireless communications, in accordance with example implementations of the present disclosure. In action 202, a UE may receive, using a first RAT, first SCI which includes a first priority value. In action 204, the UE may receive, using a second RAT, second SCI which includes a second priority value. In action 206, when the first physical channel overlaps the second physical channel in time domain, the UE may determine whether to drop one of a transmission of a first physical channel derived from (or scheduled by) the first SCI and a transmission of a second physical channel derived from (or scheduled by) the second SCI based on the first priority value and the second priority value. In some of the present implementations, the first RAT may be different from the second RAT. For example, one of the first and second RATs may be NR, and the other one may be LTE.

In some of the present implementations, a UE may further obtain a first threshold value and a second threshold value from a BS. The UE may compare the first and second threshold values with the first and second priority values, respectively, to determine whether to drop the corresponding physical channel transmission(s). For example, the UE may determine whether to drop the transmission of the first physical channel based on a comparison of the first priority value and the first threshold value, and determine whether to drop the transmission of the second physical channel based on a comparison of the second priority value and the second threshold value. In some of such implementations, the first threshold value and the second threshold value may be configured per a resource pool basis or per an anchor carrier basis. In addition, the first threshold value and the second threshold value may be configured by system information broadcast by the BS or may be contained in a pre-configuration parameter.

In some of the present implementations, the UE may drop one of the transmission of the first physical channel and the transmission of the second physical channel based on a comparison of the first priority value and the second priority value. For example, the UE may receive SCI-NR-V and SCI-format 1, and the PSSCH scheduled by the SCI-NR-V may overlap with the PSSCH scheduled by the SCI-format 1 in the time domain. It should be noted that the SCI-NR-V may be an SCI format for NR V2X mode 1 or mode 2, and the SCI-format 1 may be an SCI format for LTE V2X mode 3 and mode 4. If the priority indicator in the SCI-NR-V is set to "1" and the priority indicator in the SCI-format 1 is set to "4", the UE may adjust the transmit power for the PSSCH scheduled by the SCI-format 1. The UE may, however, keep the original transmit power for the PSSCH scheduled by the SCI-NR-V when the total transmit power exceeds the P_CMAX (because the transmit power for the PSSCH scheduled by the SCI-NR-V has a higher priority to be kept at the original value than the transmit power for the PSSCH scheduled by the SCI-format 1 in this example).

In some of the present implementations, a UE may always adjust the transmit power for an LTE-V2X PSSCH, but keep the original UL transmit power for an NR-V2X PSSCH if the LTE-V2X PSSCH and the NR-V2X PSSCH are scheduled in an overlapping time period, and the total transmit power exceeds the P_CMAX. In some other aspects of the present implementations, the UE may always adjust the transmit power for the NR-V2X PSSCH, but keep the original transmit power for the LTE-V2X PSSCH if the LTE-V2X PSSCH and the NR-V2X PSSCH are scheduled in the overlapping time period, and the total transmit power exceeds the P_CMAX.

In some of the present implementations, whether to perform the power sharing operation for different RATs may be determined per a resource pool basis, per an anchor carrier basis, or per a UE basis. In some of the present implementations, a BS may configure a UE with a power adjusting parameter to indicate whether to perform the power sharing operation. For example, the power adjusting parameter may be a true/false indicator. If the true/false indicator is set as "true," the UE may perform the power sharing operation for the different RATs. In contrast, if the true/false indicator is set as "false," the UE may not perform the power sharing operation for the different RATs. Such a power adjusting parameter may be transmitted through an RRC signaling (e.g., an RRC configuration), or contained in a pre-configuration parameter, or contained in broadcast system information.

In some of the present implementations, if a UE does not perform the power sharing operation, the UE may drop a few of physical channel transmissions for certain RATs to meet a power constraint. For example, when the UE decides to drop one or more physical channel transmissions, the UE may determine how to fulfill the power constraint based on the UE's implementation. In another example, the BS may indicate to the UE the priority order of each possible RAT, and the UE may follow the priority order to perform the power sharing operation. For example, if the priority orders of an LTE-V2X physical channel, an NR-V2X physical channel, and an NR physical channel are "3," "2," and "1," respectively, the UE may allocate the transmit power for the NR physical channel first, then the NR-V2X physical channel (if the remaining power budget is sufficient), and finally the LTE-V2X physical channel (if the remaining power budget is still sufficient).

Power Scaling Factor or Power Boosting for V2X System

In certain use cases, such as platooning, multiple UEs (e.g., vehicles) may carefully monitor signals from one specific UE. Hence, in some of the present implementations, an NR-V2X system may need to support a power boosting operation for NR-V2X physical channel transmissions. It should be noted that the physical channels described herein may include all kinds of physical channels (e.g., control, data or broadcast physical channels), as well as the RS(s) transmitted on the physical channels. In addition, the PTRS, fine time/frequency TRS, and DMRSs may be transmitted at the same transmit power level as the physical channels associated with Equations 1-1, 1-2, 2-1 and 2-2. Moreover, the transmit power ($P_{SS}$) of an SS may be determined based on the following Equation 3.

$$P_{SS}=\min\{P_{CMAX}, 10\log_{10}(M_{SS})+P_{O\_SS}+\alpha \cdot PL\} \quad \text{Equation 3}$$

In some of the present implementations, the UE may be configured with a first power boosting parameter for power boosting operations. The first power boosting parameter may be configured per a resource pool basis or per an anchor carrier basis. In some of the present implementations, the first power boosting parameter may be used to indicate a transmit power offset (e.g., $P_{O\_SS}$). In some of the present implementations, the first power boosting parameter may be used to indicate a ratio of pathloss compensation (e.g., the $\alpha$ value in Equation 3). The UE may follow Equation 3 to calculate the transmit power for the SSs. In some of the present implementations, the UE may select the $\alpha$ value per a resource pool basis. For example, the $\alpha$ value may be "1" for resource pool #1 and "0.8" for resource pool #2.

In some of the present implementations, the UE may be configured with a second power boosting parameter for power boosting. The second power boosting parameter may be configured per a resource pool basis or per an anchor carrier basis. An example power boosting for a transmit power ($P_{SS}$) of an SS may be as follows.

$$P_{SS}=\min\{P_{CMAX}, 10\log_{10}(M_{SS})+P_{O\_SS}+\alpha \cdot PL+\beta_{SS}\} \quad \text{Equation 4}$$

In the above equation, $\beta_{SS}$ is a second power boosting parameter for the SS, and $M_{SS}$ is the bandwidth of a Sidelink SS (SLSS) resource assignment expressed in the number of resource blocks.

As shown in Equation 4, when the UE follows Equation 4 to calculate the transmit power of the SS, the second power boosting parameter may directly affect the transmit power of the SS. Thus, the second power boosting parameter may be used to determine the increment (e.g., in [dB]) of the transmit power when a power boosting operation is triggered. As described above, the second power boosting parameter may be configured per a resource pool basis or per an anchor carrier basis. For example, the value of the second power boosting parameter may be "0 dB" for resource pool #1 and "3 dB" for resource pool #2. In such a case, the UE may not perform the power boosting operation if the UE selects to perform transmissions on resource pool #1, whereas the UE may perform a 3 dB-power boosting operation if the UE selects to perform transmissions on resource pool #2.

The power boosting operation described herein may also be applied in the calculation of the transmit power of various physical channels/signals. For example, a power boosting of the transmit power ($P_{PSSCH}$) for the DMRSs of a PSSCH may be expressed as follows.

$$P_{PSSCH} = 10\log_{10}\left(\frac{M_{PSSCH}}{M_{PSSCH}+10^{\frac{3}{10}} \times M_{PSCCH}}\right) + A' \quad \text{Equation 5}$$

where $$A = \min\begin{cases} P_{CMAX}, P_{MAX\_CBR}, \\ 10\log_{10}\left(M_{PSSCH}+10^{\frac{3}{10}} \times M_{PSCCH}\right)+ \\ P_{O\_PSSCH}+\alpha \cdot PL+B_{PSSCH} \end{cases},$$

and $\beta_{PSSCH}$ is a second power boosting parameter for the PSSCH.

The UE may follow Equation 5 to calculate the transmit power for DMRSs of the PSSCH.

Figure 3:
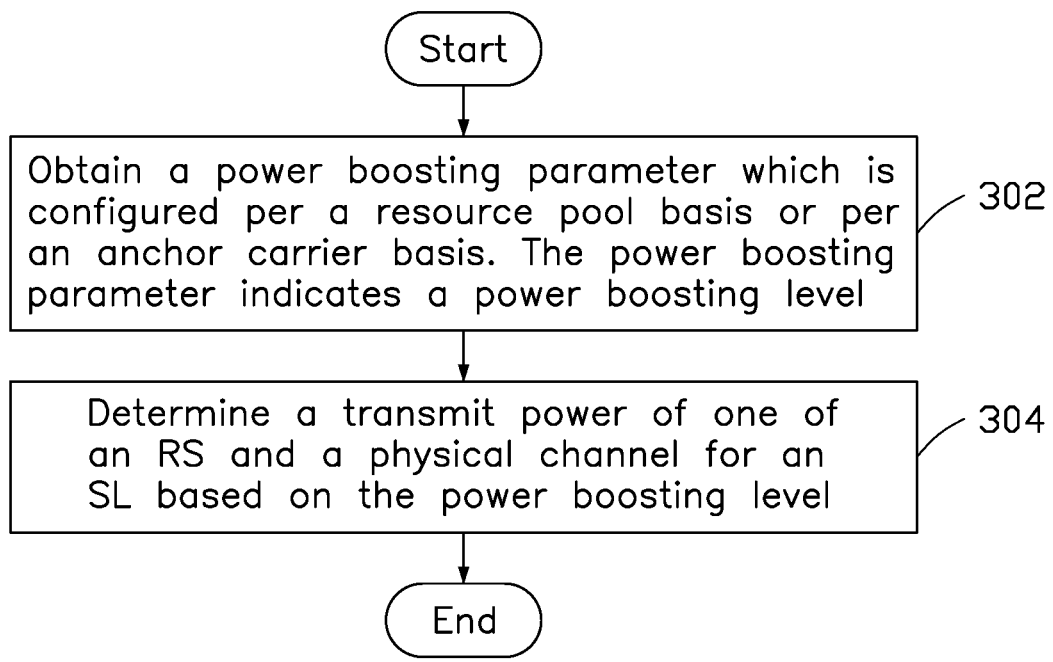
FIG. 3 is a flowchart for a method of performing a power boosting operation, in accordance with example implementations of the present disclosure.

FIG. 3 is a flowchart for a method of performing a power boosting operation, in accordance with example implementations of the present disclosure. In action 302, the UE may obtain a power boosting parameter which is configured per a resource pool basis or per an anchor carrier basis. The power boosting parameter may indicate a power boosting level. In action 304, the UE may determine a transmit power of one of an RS and a physical channel for an SL based on the power boosting level.

For example, according to Equation 5, if the power boosting level indicated by $\beta_{PSSCH}$ is "0 dB" for resource pool #1 and is "3 dB" for resource pool #2, the UE may not perform a power boosting operation if the UE selects to perform the transmissions on resource pool #1, whereas the UE may perform a 3 dB-power boosting operation if the UE selects to perform the transmissions on resource pool #2.

In some of the present implementations, if a UE is not configured with the second power boosting parameter, the UE may not perform a power boosting operation. In some of the present implementations, the second power boosting parameter may be a true/false indicator used to indicate whether a UE performs a power boosting operation or not. In some of such implementations, the scale of power boosting may be defined in a pre-configuration parameter. For example, the scale of power boosting may be 3 dB by default. In such a case, if the value of the second power boosting parameter is configured as "true" for resource pool #1, while the value is "false" for resource pool #2, the UE may perform a 3 dB power boosting operation when the UE transmits the SSs in resource pool #1. Such a UE may not perform the power boosting operation when the UE transmits the SSs in resource pool #2. In some of the present implementations, the first power boosting parameter or the second power boosting parameter may be independently configured for different physical channels and different reference signals. For example, the second power boosting parameter may be different and configured separately for different Information Elements (IEs). In another example, all the physical channels and different reference signals may apply the same second power boosting parameter. In addition, the first power boosting parameter and/or the second power boosting parameter may be contained in an RRC configuration, a pre-configuration, or in the broadcast system information.

In some of the present implementations, whether to perform a power boosting operation may depend on the information received from a logical channel. For example, a UE may determine whether to perform a power boosting operation of one of a reference signal and a physical channel for an SL based on an indication contained in a logical channel configuration. Such an indication may be a third power boosting parameter (e.g., Powerboost_indicator) which may be configured per a logical channel basis or per a logical channel group basis.

The Medium Access Control (MAC) entity of a UE may determine whether to instruct the physical layer to perform a power boosting operation or not according to a third power boosting parameter. In some of the present implementations, when a UE attempts to perform an NR-V2X transmission, the UE may select a ProSe destination (having an SL logical channel with the highest priority than other SL logical channels having available data for transmission). If the selected SL logical channel is associated with a few of specific ProSe destinations (e.g., platooning), the MAC entity of the UE may instruct the physical layer to perform the power boosting operation. The third power boosting parameter (e.g., Powerboost_indicator) for each logical channel may be determined based on the requirement of a ProSe destination. For example, if the MAC entity of the UE selects logical channel #3 for an NR-V2X transmission, and the third power boosting parameter (e.g., Powerboost_indicator) associated with logical channel #3 is set as "true," the MAC entity of the UE may instruct the physical layer to perform a power boosting operation.

In some of the present implementations, the SCI (e.g., SCI_NR_V) may contain a fourth power boosting parameter (e.g., Powerboost_indicator_SCI) for indicating to a UE whether to boost the transmit power of a scheduling PSSCH and/or a PSCCH. For example, when a UE receives the fourth power boosting parameter (e.g., Powerboost_indicator_SCI) that is set as "true" in the SCI (e.g., SCI_NR_V), the UE may consider that the transmit power of the RS(s) (e.g., the PTRS and the fine time and frequency TRS) and the physical channel(s) associated with the SCI need to be boosted.

In some of the present implementations, whether to perform a power boosting operation may depend on the information in the DCI (e.g., DCI_NR_V).

Figure 4:
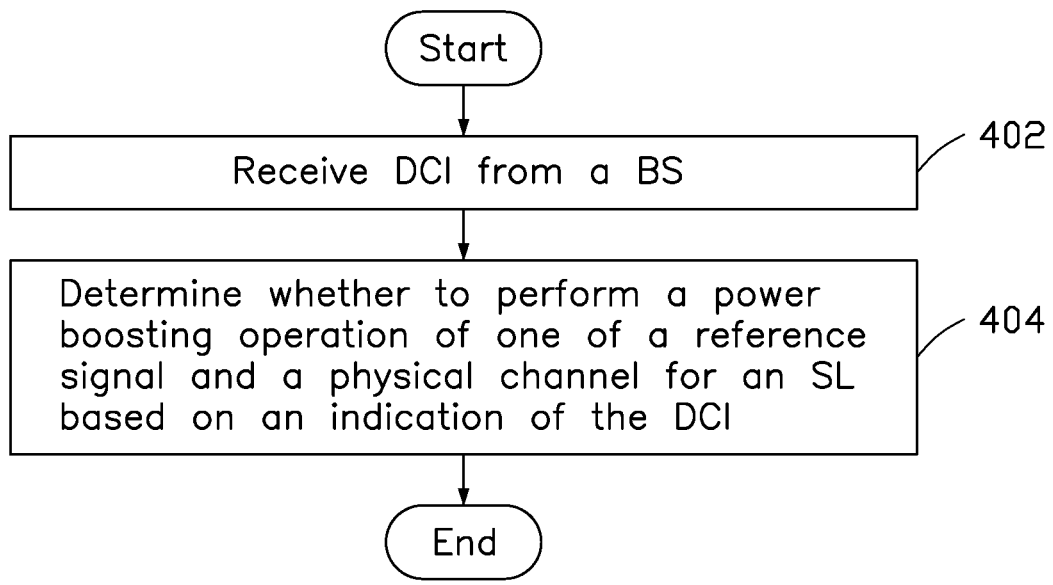
FIG. 4 is a flowchart for a method of triggering a power boosting operation, in accordance with example implementations of the present disclosure.

FIG. 4 is a flowchart for a method of triggering a power boosting operation, in accordance with example implementations of the present disclosure. In action 402, a UE may receive the DCI from a BS. In action 404, the UE may determine whether to perform a power boosting operation of one of a reference signal and a physical channel for an SL based on an indication of the DCI. For example, the DCI (e.g., DCI_NR_V) may contain a fifth power boosting parameter (e.g., Powerboost_indicator_DCI) used to indicate to the UE whether to perform a power boosting operation for a PSSCH and/or a PSCCH. If the fifth power boosting parameter is set as "true," the UE may perform a power boosting operation for the PSSCH and/or the PSCCH (as well as the RSs (e.g., the DMRS of the PSBCH, the DMRS of the PSCCH, the DMRS of the PSSCH, the PTRS, the fine time and frequency TRS and the SS) associated with the physical channels). In contrast, if the fifth power boosting parameter is set as "false," the UE may not perform the power boosting operation for the PSSCH and/or the PSCCH (as well as the RSs associated with the physical channels).

In some of the present implementations, if a UE receives a fifth power boosting parameter set as "true" in the DCI (e.g., DCI_NR_V), the UE may boost the transmit power of a PSCCH and/or a PSSCH scheduled by the PSCCH by a default value (e.g., 3 dB). In some of the present implementations, the DCI (e.g., DCI_NR_V) may include two independent power boosting parameters: one may be used for indicating whether to trigger a power boosting operation for a PSSCH, and the other one may be used for indicating whether to trigger a power boosting operation for a PSCCH. In some of such implementations, the scale of power boosting may be configured for each resource pool or each anchor carrier in an RRC configuration, a pre-configuration parameter, or broadcasting system information.

In some of the present implementations, if there is no power boosting parameter contained in anyone of an RRC configuration, a pre-configuration parameter, broadcast system information, SCI and DCI, the UE may not perform a power boosting operation, for example, when the UE attempts to perform an NR-V2X transmission.

In should be noted that the power boosting parameter described herein may be referred to as one of the first, second, third, fourth and fifth power boosting parameter, as described above. In some of the present implementations, the power boosting parameter may be contained in an RRC configuration, a pre-configuration parameter, or may be configured via broadcast system information.

Figure 5:
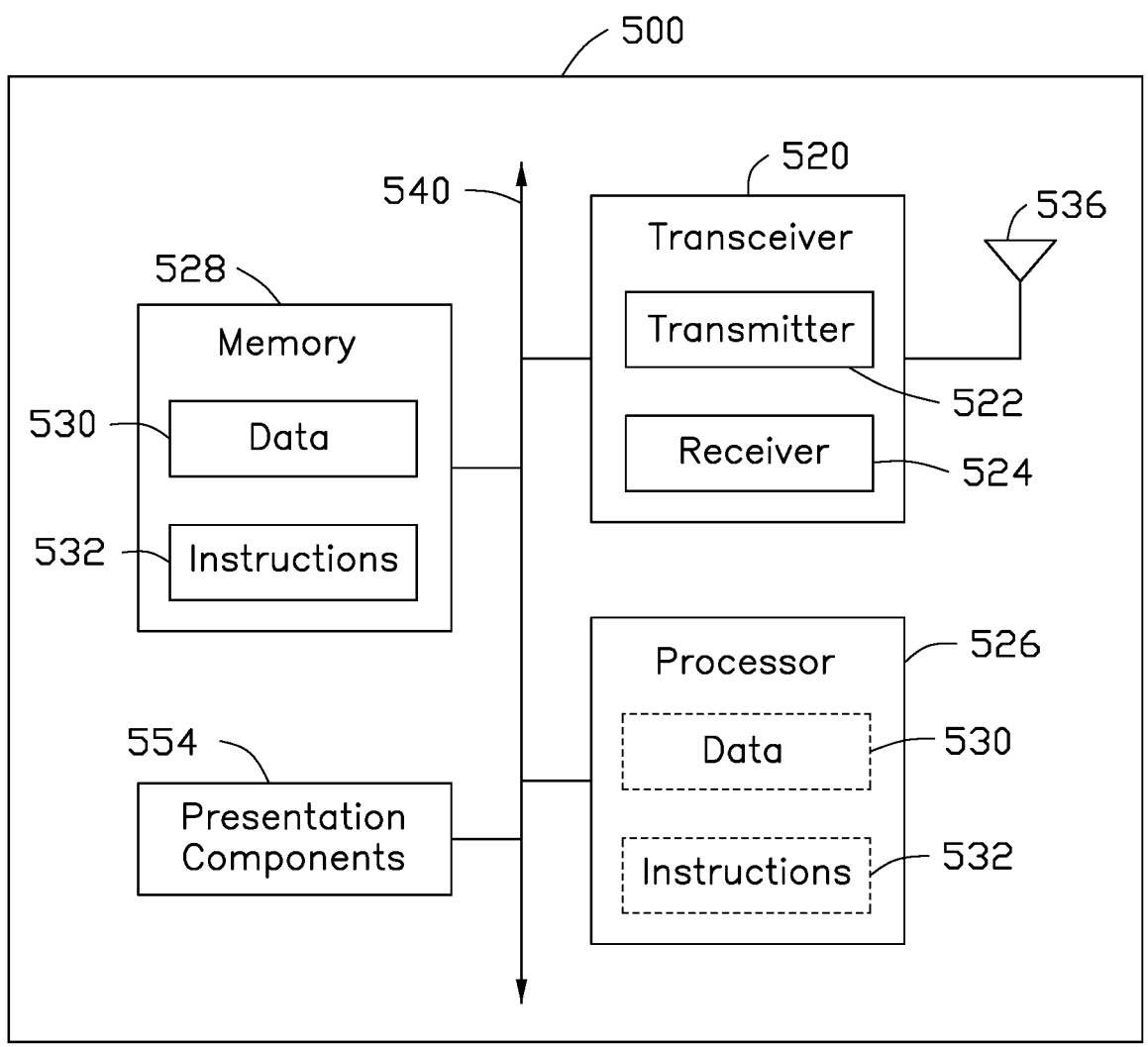
FIG. 5 is a block diagram illustrating a node for wireless communication, in accordance with various aspects of the present disclosure.

FIG. 5 is a block diagram illustrating a node for wireless communication, in accordance with various aspects of the present disclosure. As shown in FIG. 5, a node 500 may include a transceiver 520, a processor 526, a memory 528, one or more presentation components 554, and at least one antenna 536. The node 500 may also include an RF spectrum band module, a BS communications module, a network communications module, and a system communications management module, Input/Output (I/O) ports, I/O components, and power supply (not explicitly shown in FIG. 5). Each of these components may be in communication with each other, directly or indirectly, over one or more buses 540. In one implementation, the node 500 may be a UE or a BS that performs various functions described herein, for example, with reference to FIGS. 1 through 4.

The transceiver 520 having a transmitter 522 (e.g., transmitting/transmission circuitry) and a receiver 524 (e.g., receiving/reception circuitry) may be configured to transmit and/or receive time and/or frequency resource partitioning information. In some implementations, the transceiver 520 may be configured to transmit in different types of subframes and slots including, but not limited to, usable, non-usable and flexibly usable subframes and slot formats. The transceiver 520 may be configured to receive data and control channels.

The node 500 may include a variety of computer-readable media. Computer-readable media may be any available media that may be accessed by the node 500 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or data. Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 528 may include computer-storage media in the form of volatile and/or non-volatile memory. The memory 528 may be removable, non-removable, or a combination thereof. Example memory includes solid-state memory, hard drives, optical-disc drives, etc. As illustrated in FIG. 5. The memory 528 may store computer-readable, computer-executable instructions 532 (e.g., software codes) that are configured to, when executed, cause the processor 526 to perform various functions described herein, for example, with reference to FIGS. 1 through 4. Alternatively, the instructions 532 may not be directly executable by the processor 526 but be configured to cause the node 500 (e.g., when compiled and executed) to perform various functions described herein.

The processor 526 (e.g., having processing circuitry) may include an intelligent hardware device, e.g., a Central Processing Unit (CPU), a microcontroller, an ASIC, etc. The processor 526 may include memory. The processor 526 may process the data 530 and the instructions 532 received from the memory 528, and information through the transceiver 520, the base band communications module, and/or the network communications module. The processor 526 may also process information to be sent to the transceiver 520 for transmission through the antenna 536, to the network communications module for transmission to a core network.

One or more presentation components 554 presents data indications to a person or other device. Examples of presentation components 554 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the implementations described above, but many rearrangements, modifications, and substitutions are possible without departing from the scope of the present disclosure.

What is claimed is:

1. A user equipment (UE) comprising:
one or more non-transitory computer-readable media having computer-executable instructions embodied thereon; and
at least one processor coupled to the one or more non-transitory computer-readable media, and configured to execute the computer-executable instructions to:
receive, using a first Radio Access Technology (RAT), first Sidelink (SL) Control Information (SCI) comprising a first priority value associated with the first RAT, the first SCI having a first SCI format;
receive, using a second RAT, second SCI comprising a second priority value associated with the second RAT, the second SCI having a second SCI format which is different from the first SCI format; and
when a transmission of a first physical channel derived from the first SCI and a transmission of a second physical channel derived from the second SCI overlaps in a time domain:
determine a priority order of the first RAT and the second RAT by comparing the first priority value with the second priority value; and
determine to drop one of a transmission of the first physical channel derived from the first SCI and the transmission of the second physical channel derived from the second SCI according to the priority order.

2. The UE of claim 1, wherein the at least one processor is further configured to execute the computer-executable instructions to:
receive Downlink Control Information (DCI) from a base station (BS); and determine whether to perform a power boosting operation of one of a reference signal and a physical channel for an SL based on an indication of the DCI.

3. The UE of claim 1, wherein the at least one processor is further configured to execute the computer-executable instructions to:
obtain a power boosting parameter which is configured based on a resource pool or based on an anchor carrier, the power boosting parameter indicating a power boosting level; and
determine a transmit power of one of a reference signal and a physical channel for an SL based on the power boosting level.

4. The UE of claim 1, wherein the at least one processor is further configured to execute the computer-executable instructions to:
determine whether to perform a power boosting operation of one of a reference signal and a physical channel for an SL based on an indication contained in a logical channel configuration.

5. The UE of claim 1, wherein the at least one processor is further configured to execute the computer-executable instructions to:
determine a pathloss value for an SL based on a reference signal index,
wherein the reference signal index is associated with a reference signal of a most recent Master Information Block-SL (MIB-SL) successfully decoded by the UE.

6. The UE of claim 1, wherein the at least one processor is further configured to execute the computer-executable instructions to:
determine a pathloss value for an SL based on a Synchronization Signal Block (SSB) which is associated with a Physical Downlink Shared Channel (PDSCH) on which the UE receives a System Information Block (SIB).

7. The UE of claim 1, wherein the at least one processor is further configured to execute the computer-executable instructions to:
determine a pathloss value for an SL based on a Synchronization Signal Block (SSB) associated with a Physical Downlink Control Channel (PDCCH) containing scheduling information of a System Information Block (SIB).

8. A method performed by a user equipment (UE), the method comprising:
receiving, using a first Radio Access Technology (RAT), first Sidelink (SL) Control Information (SCI) comprising a first priority value associated with the first RAT, the first SCI having a first SCI format;
receiving, using a second RAT, second SCI comprising a second priority value associated with the second RAT, the second SCI having a second SCI format which is different from the first SCI format; and
when a transmission of a first physical channel derived from the first SCI and a transmission of a second physical channel derived from the second SCI overlaps in a time domain:
determining a priority order of the first RAT and the second RAT by comparing the first priority value with the second priority value; and
determining to drop one of the transmission of the first physical channel derived from the first SCI and the transmission of the second physical channel derived from the second SCI according to the priority order.

9. The method of claim 8, further comprising:
receiving Downlink Control Information (DCI) from a base station (BS); and
determining whether to perform a power boosting operation of one of a reference signal and a physical channel for a Sidelink (SL) based on an indication of the DCI.

10. The method of claim 8, further comprising:
obtaining a power boosting parameter which is configured based on a resource pool or based on an anchor carrier basis, wherein the power boosting parameter indicating a power boosting level; and
determining a transmit power of a reference signal or a physical channel for an SL based on the power boosting level.

11. The method of claim 8, further comprising:
determining whether to perform a power boosting operation of one of a reference signal and a physical channel for an SL based on an indication contained in a logical channel configuration.

12. The method of claim 8, further comprising:
determining a pathloss value for an SL based on a reference signal index,
wherein the reference signal index is associated with a reference signal of a most recent Master Information Block-SL (MIB-SL) successfully decoded by the UE.

13. The method of claim 8, further comprising:
determining a pathloss value for an SL based on a Synchronization Signal Block (SSB) which is associated with a Physical Downlink Shared Channel (PDSCH) on which the UE receives a System Information Block (SIB).

14. The method of claim 8, further comprising:
determining a pathloss value for an SL based on a Synchronization Signal Block (SSB) associated with a Physical Downlink Control Channel (PDCCH) containing scheduling information of a System Information Block (SIB).

* * * * *